United States Patent [19]

Suzuki et al.

[11] Patent Number: 4,771,424
[45] Date of Patent: Sep. 13, 1988

[54] ROUTING CONTROL METHOD IN A PACKET SWITCHING NETWORK

[75] Inventors: Michio Suzuki; Takashi Kanoh; Tohru Hoshi, all of Yokohama; Jiro Kashio, Kawasaki; Yasushi Takeuchi, Hadano, all of Japan

[73] Assignees: Hitachi, Ltd.; Hitachi Seibu Soft Ware Co., both of Tokyo, Japan

[21] Appl. No.: 905,953

[22] Filed: Sep. 11, 1986

[30] Foreign Application Priority Data

Sep. 20, 1985 [JP] Japan .................. 60-206529

[51] Int. Cl.$^4$ .............................................. H04J 3/00
[52] U.S. Cl. ........................................ 370/86; 370/88; 370/94; 340/825.05
[58] Field of Search ...................... 370/60, 94, 85, 86, 370/89, 88; 340/825.05

[56] References Cited

U.S. PATENT DOCUMENTS

| | | | |
|---|---|---|---|
| 4,320,500 | 3/1982 | Barberis et al. | 370/94 |
| 4,399,531 | 8/1983 | Grande et al. | 370/94 |
| 4,510,600 | 4/1985 | Tan | 370/94 |
| 4,551,833 | 11/1985 | Turner | 370/94 |

FOREIGN PATENT DOCUMENTS 3211969 10/1983 Fed. Rep. of Germany.
2019166 10/1979 United Kingdom.

OTHER PUBLICATIONS

STC 77 Conference Record, vol. 2; "Routing Algorithms for Computer Networks—A Survey"; Part 1–3, pp. 28:1-1 to 28:1-5 McQuillan.
Patent Abstracts of Japan, vol. 5 No. 11, 23 Jan 1981 JP-A-55 140 350.
Proceedings of the 7th International Conference on Communications, Applying Dynamic Routing for a General Network Architecture"; 10/30/84 to 11/2/84; pp. 716–721.

Primary Examiner—Douglas W. Olms
Assistant Examiner—Frank M. Scutch, III
Attorney, Agent, or Firm—Antonelli, Terry & Wands

[57] ABSTRACT

In a communication network, in which a plurality of switching nodes are connected with each other through a plurality of relay lines and one of the switching nodes acts as a center node for network routing, the center node estimates the state of delay of data for every relay line on the basis of information previously inputted, indicating the communication network configuration, and the state of delay of data reported by each of the switching nodes, and informs each of the switching nodes of said estimated state of delay of data. Each of the switching nodes determines and selects the relay line giving the shortest delay of data for every destination, to which it outputs data, on the basis of the state of delay at the relevant switching node itself and that received from the center node.

12 Claims, 6 Drawing Sheets

| 30A | |
|---|---|
| a | 2 |
| b | 4 |
| c | 3 |

| 30B | |
|---|---|
| d | 3 |
| e | 4 |

| 30C | |
|---|---|
| f | 2 |
| g | 6 |
| h | ∞ |

| 30D | |
|---|---|
| i | ∞ |
| j | 5 |

FIG. 7

| LINE / DESTINATION NODE \ SOURCE NODE | A | | | B | | C | | | D | |
|---|---|---|---|---|---|---|---|---|---|---|
| | a | b | c | d | e | f | g | h | i | j |
| A | | | | 0 | 5 | 3 | 0 | 5 | 5 | 0 |
| B | 0 | 2 | 7 | | | 0 | 2 | 7 | 2 | 2 |
| C | 4 | 0 | 9 | 4 | 0 | | | | 0 | 4 |
| D | 6 | 8 | 0 | 3 | 8 | 6 | 3 | 0 | | |

31
DESTINATION NODE

| LINE \ | A | B | D |
|---|---|---|---|
| f | 3 | 0 | 6 |
| g | 0 | 2 | 3 |
| h | 5 | 7 | 0 |

32 QUEUE LENGTH

| LINE | |
|---|---|
| f | 2 |
| g | 4 |
| h | $\infty$ |

33
DESTINATION NODE

| LINE \ | A | B | D |
|---|---|---|---|
| f | 5 | 2 | 8 |
| g | 4 | 6 | 7 |
| h | $\infty$ | $\infty$ | $\infty$ |

SENDING LINE

| | g | f | g |
|---|---|---|---|

|   | A | B | C | D |
|---|---|---|---|---|
| A |   | 1 | 1 | 1 |
| B | 1 |   | 1 | 0 |
| C | 1 | 1 |   | 1 |
| D | 1 | 0 | 1 |   |

|   | A | C | D |
|---|---|---|---|
| d | 0 | 1 | 1 |
| e | 1 | 0 | 1 |

42

ROUTING CONTROL METHOD IN A PACKET SWITCHING NETWORK

BACKGROUND OF THE INVENTION

1. FIELD OF THE INVENTION

This invention relates to a routing control method in a data switching network, and more specifically to an adaptive routing method permitting to take measures against occurrence of load fluctuations or obstructions.

2. DESCRIPTION OF PRIOR ART

Recently a data switching network, more specifically a packet switching network has been adopted in many data communication networks such as VAN (value-added network) and so forth. In a packet switching network, unless each switching node has any information about the circumstances of the network, it is required that it send messages (packets) through each of the routes at random, because it cannot select the optimum route to the destination station, and naturally this gives rise to a problem such as delay in transmission of information, etc. Consequently adaptive routing techniques permitting the selection of the optimum route, depends on the condition of the network for implementing a packet switching network.

Concerning the adaptive routing method, heretofore, various studies have been reported e.g. in Routing Techniques for Store-and-Forward Computer-Communication Networks, ICC, 1971 by G. L. Flutz and L. Kleinrock. However, according to the prior art adaptive routing method, since updating of the estimated delay at the center has been effected only when some obstructions have occurred or when the network configuration has been modified and since the estimated delay has not depended on the load of each of the switching nodes but has been fixed in the cases other than those described above, selection of the route has been effected, taking into account the load at the switching node determining the route, but without taking into account the load at relay switching nodes receiving messages.

SUMMARY OF THE INVENTION

The object of this invention is to provide an adaptive routing control method, by which each of the switching nodes can send and relay data, while selecting a route with the shortest delay time to the destination node.

In order to achieve this object, the routing method according to this invention for a communication network, in which a plurality of switching nodes are connected with each other through a plurality of relay lines and one of the switching nodes acts as a center node for network routing, is characterized by comprising:

a step, by which each of the switching nodes reports the status of data transmission delay for each of the relay lines connected thereto to the center node;

a step, by which the center node estimates the state of delay of data for every relay line which the relevant switching node can select, when it sends data to one of the other switching nodes on the network, on the basis of information previously inputted, indicating the communication network configuration, and the state of delay of data reported by each of the switching nodes;

a step, by which the center node informs each of the switching nodes of the estimated state of delay of data for the relay line which the relevant switching node can select; and a step, by which each of the switching nodes decides the correspondence relation between the other switching nodes on the network and the relay line to be selected, on the basis of the state of delay of data received from the center node and the real state of delay of data at the relevant switching node, whereby each of the switching nodes outputs data to one of the relay lines according to the correspondence relation.

More specifically, according to this invention, the state of delay of data for each of the relay lines estimated by the center node is represented e.g. by the duration of a delay of data from the switching node adjacent to the relevant switching node, which sends the data, on each of the relay lines to the destination switching node, to which the data are directed, and the relevant switching node decides the relay line, for which the delay of data to the destination switching node is the shortest, on the basis of the sum of the delay of data received from the center node for each of the relay lines and the real delay of data at the relevant switching node for each of the relay lines.

According to a modification of this invention, the state of delay of data for each of the relay lines estimated by the center node is a numerical value which is increased or decreased depending on the state of delay of data reported by each of the switching nodes, using the number of relay lines from the switching node adjacent to the relevant switching node, which sends the data, on each of the relay circuits to the destination switching node, to which the data are directed, as the initial value; and the relevant switching node decides the relay line, for which the delay of data to the destination switching node is the shortest, on the basis of the sum of the numerical value representing the delay of data received from the center node for each of the relay lines and the numerical value representing the real delay of data at the relevant switching node for each of the relay lines.

The foregoing and other objects, advantages, manner of operation and novel features of the present invention will be understood from the following detailed description when read in connection with the accompanying drawings.

DESCRIPTION OF THE PREFERRED EMBODIMENTS

Hereinbelow the several illustrated embodiments of this invention will be explained.

(Embodiment 1)

Figure 1:
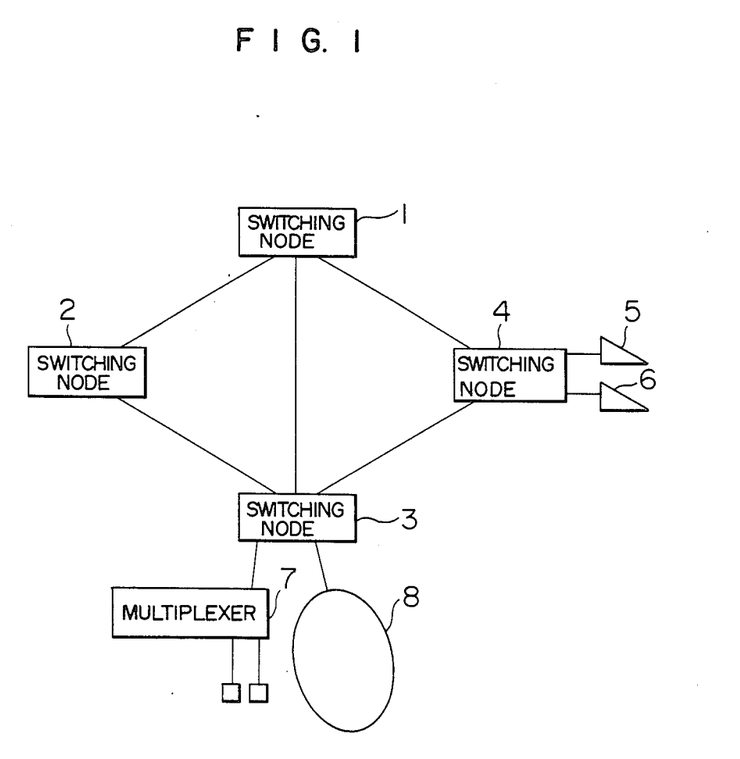
FIG. 1 is a schematic diagram illustrating the system structure of a packet switching network.
Figure 2:
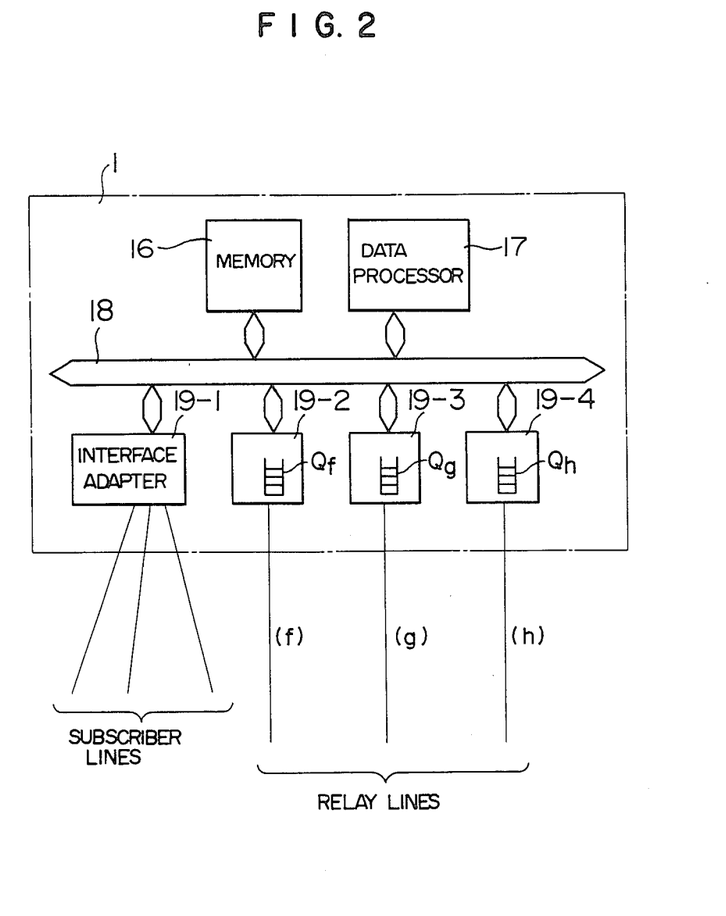
FIG. 2 is a block diagram illustrating the structure of a switching node.

FIG. 1 is a scheme illustrating the system structure of a packet switching network. Packet switching nodes 1 to 4 are connected with each other through relay lines, each of which nodes can be connected to a multiplexer, to packet type terminals 5, 6 through a CCITT recommendation X.25 interface, or to another packet switching network 8, etc. through a CCITT recommendation X.75 interface. FIG. 2 is a block diagram illustrating the general structure of hardware included in the packet switching nodes 1 to 4, in which a processor 17, a memory 16, and line interface adapters 19 (19-1 to 19-4) are mutually connected through a bus 18. Usually a packet switching node receives a plurality of subscriber lines and a plurality of relay lines and packets received through these lines are stored first in the memory 16 via the line interface adapters 19. After that the processor 17 selects a sending line for every packet according to its destination and sends it through a related one of the line interface adapters 19-1 to 19-4. The processor 17 has some routing table (usually a correspondence table between destination switching nodes and sending lines) in the memory 16 and this selection of the sending line is effected by referring to the routing table.

Figure 3:
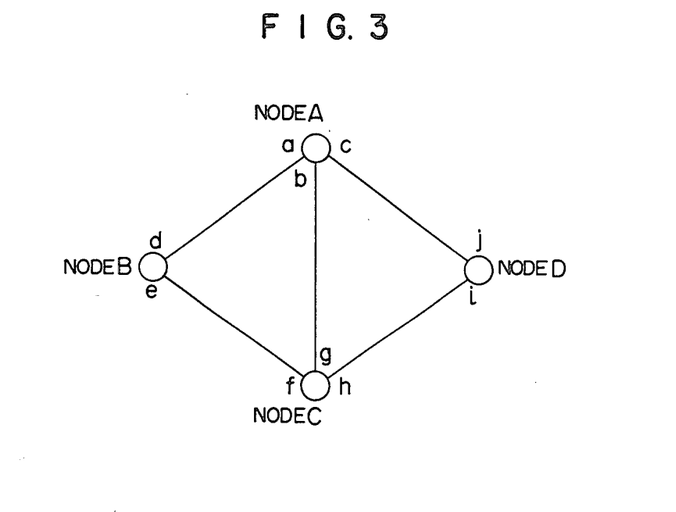
FIG. 3 is a scheme for explaining a model of the packet switching network.

FIG. 3 is an example of a schematic diagram showing switching nodes and relay lines in FIG. 1. It is assumed, in this example, that the node A has the function of the network routing center. The notations a–j are line numbers for identifying the sending lines from each of the switching nodes.

Figure 4:
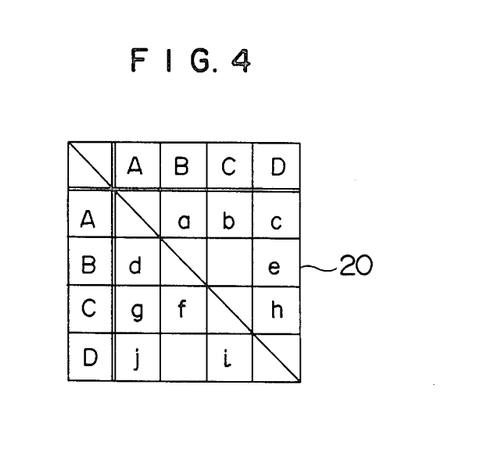
FIG. 4 is a connection state table used in the host switching node according to this invention.
Figure 5:
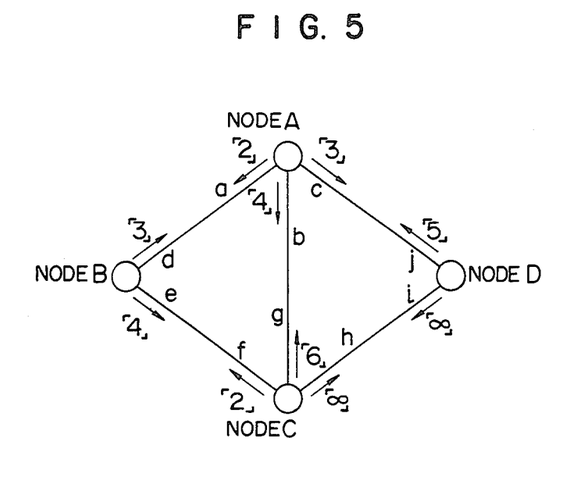
FIG. 5 is a scheme for explaining the state of lines in the network.
Figure 6A:
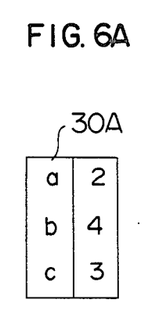
FIGS. 6A to 6D show information of switching nodes A to D, respectively, reported to the center node.
Figure 6B:
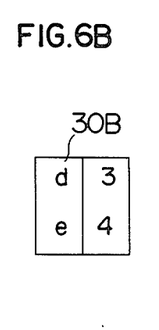
Figure 6C:
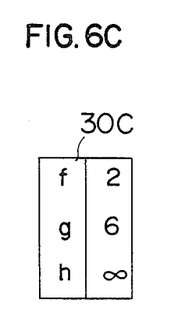
Figure 6D:
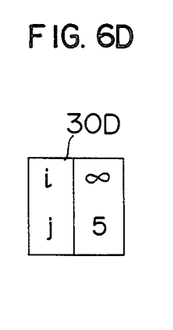

FIG. 4 shows a connection state table 20, which the node A having the function of the center holds as network configuration information. The connection state table 20 shows with which nodes and through which lines each of the switching nodes is connected and is updated, when the network configuration is changed. FIG. 5 shows an example of states of the queue length for each of the lines at each of the nodes A to D. FIGS. 6A to 6D show report content 30A–30D on the state of lines sent by each of the nodes A, B, C and D to the center. Each of the nodes estimates the delay time to the node adjacent thereto on the basis of the queue length produced at each of the lines of the node itself and the estimated delay time is reported periodically to the network routing center in the form of a packet. This delay time can be the queue length itself. In those situations where obstructions are produced in the network, the estimated delay time for a line for which it is impossible to send any packet due to an obstruction is infinite.

Figure 7:
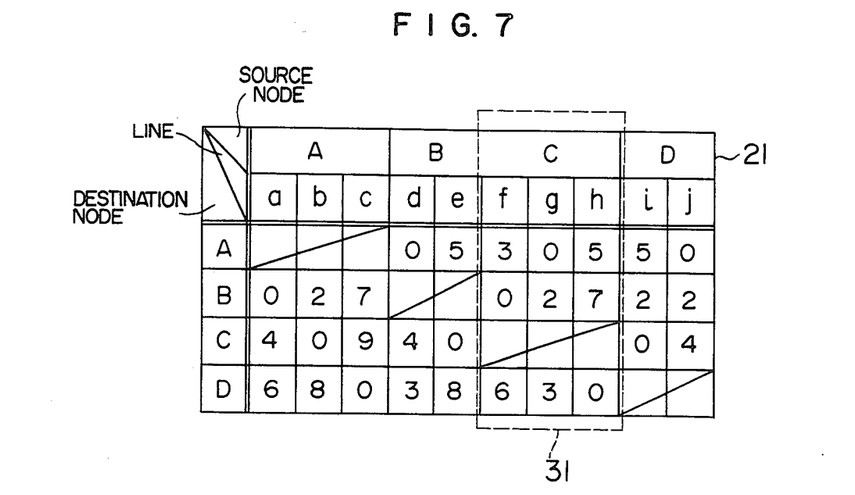
FIG. 7 indicates an estimated delay table 21.

FIG. 7 is a scheme illustrating the estimated delay time table 21 held by the network routing center (node A). The node A having the center function forms an estimated delay time table 21 periodically or every time it receives a report from each of the nodes, on the basis of the connection state table 20 and reports 30A–30D from each of the switching nodes indicated in FIGS. 6A–6D. The content of the estimated delay time table 21 indicates the minimum value of the estimated delay time from the node adjacent to the relevant node to the destination node, in the case where one of the nodes selects a certain sending line. The lines on the estimated delay time table correspond to the lines at each of the switching nodes in FIG. 3 and the state of the queue length of each of the line corresponds to the numerical values indicating the delay time in FIG. 5. The lines h and i in FIG. 5, whose numerical value is indicated by "∞", are broken down, or the notation means that their queue length is infinite (in practice it exceeds a certain threshold value). FIG. 7 indicates estimated delay time from the adjacent node to the destination node. For example, the estimated delay time for the line e at the source node B indicates the minimum value of the sum of queue lengths in lines from the adjacent node C on the line e. That is, taking the route from the node C to the node A as an example, for the route C→B→A it is 2+3, i.e. 5, for the route C→A it is 6 and for the route C→D→A it is ∞. Among these values the smallest value "5" is the value indicating the estimated delay time from the node B to the node A via the line e. Further, for the route from the node C to the destination node A via the route h indicated in FIG. 7, since the value in question is the delay time from the adjacent node D on the route h indicated in FIG. 7 to the node A, it is not ∞ but 5.

The node A having the center function sends the relevant part of the estimated delay time table 21 in the form of a packet as a bias table to each of the nodes indicated as source nodes indicated in the estimated delay time table 21. For example, for the node C the node A sends the part 31 enclosed by a broken line in FIG. 7 as the bias table.

When the node C receives a message, whose content is the bias table 31 stated above through the relay line g, it takes-in these data through a line interface adapter 19 and writes them in a predetermined area on a memory 16 by means of a processor 17.

Figure 8:
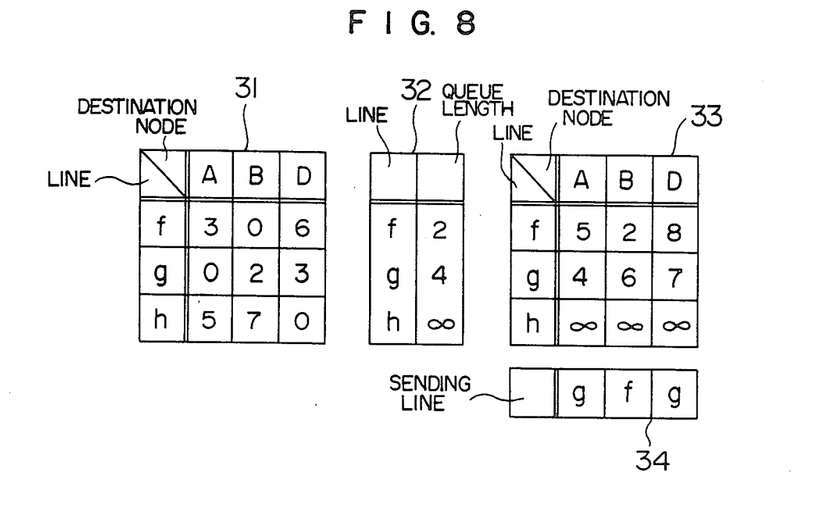
FIG. 8 represents schemes for explaining the line selection at the node C.

The processor 17 prepares a waiting queue table 32 indicated in FIG. 8 for its own node at that moment on the basis of send-out waiting queues Qf, Qg and Qh, which are produced in the line adapter of its own node, and adds it to the value of the bias table 31. A table 33 is obtained by this addition operation and in this way it becomes possible to prepare a sending line table 34 for each of the destination nodes by selecting the line for which the delay time is shortest. When the relevant node receives a packet to be relayed from each of the lines, it stores the packet first in the memory 16, refers to the sending line table 34 according to its destination node and sends the packet to the corresponding line interface adapter.

The line interface adapters 19-1 to 19-4 inform periodically the processor 17 of the state (presence or absence of obstructions, queue length) of the lines of its own adapter. The processor 17 brings the state of all the adapters and reports it to the center as a state message 30C.

The nodes A, B and D performs the same processing as that stated above for the node C. In this way, for each of the packets, which have been produced in the network, a routing to its destination node is effected, while selecting lines giving the shortest delay time from the relevant node to the destination node.

In the embodiment described above, although in the case, where reports of state information 30 (30A–30D) from each of the packet switching nodes to the center is effected periodically has been explained, the reports must not be effected necessarily periodically, but they can be reported, only when some variations are produced, such as in the case where an obstruction is produced or removed, concerning the line state; in the case where the value exceeds a threshold value determined appropriately for each of the lines, concerning the state of the queue length; in the case where the value decreases from the state, where it is over the threshold value, to the state, where it is thereunder; etc. An embodiment for this case will be explained below. In this second embodiment also the network configuration indicated in FIG. 3 is presumed similarly to the embodiment 1.

(Embodiment 2)

Figure 9:
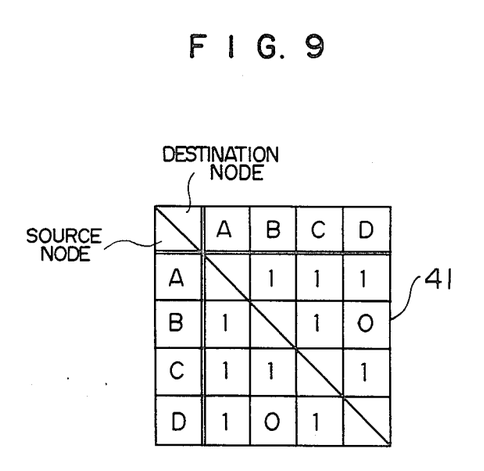
FIG. 9 is a table 41 indicating the distance between adjacent nodes used in another embodiment.
Figure 10:
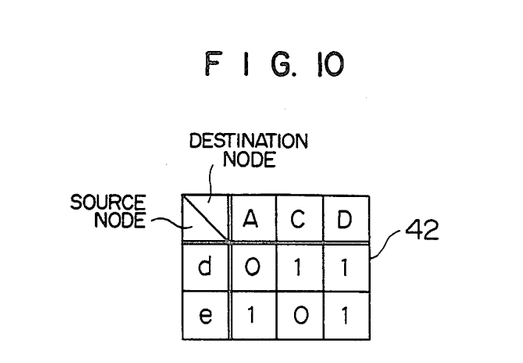
FIG. 10 shows another embodiment of the estimated delay table.

The center has an internodal connection distance table 41 indicated in FIG. 9, which represents with which switching nodes each of them is connected. The center obtains the number of hops (number of routes) from the node adjacent to the relevant node to the destination node, which is distributed as an estimated delay time table replacing the bias table stated above to each of the switching nodes. FIG. 10 shows an example of estimated delay time tables 42 for the node B. When it is distributed, it is also conceivable that each of the switching nodes has no estimated delay time table for its own node. In this case it may be transmitted thereto by broadcast.

Each of the general switching nodes selects the sending line for which the sum of the estimated delay time stated above from the adjacent node to the destination node and the queue length for each of the sending lines of the own node is the smallest. In this case, in order to normalize various line speeds, it is preferable to use a value obtained by dividing the real queue length by a threshold queue length appropriately determined according to the line speed as a value representing the queue length.

Each of the switching nodes reports, to the center, obstructions in lines, that the queue length for the sending line of its own node exceeds a certain threshold queue length, removal of the obstructions in the lines, or that the value decreases from the state, where it is over the threshold value, to the state, where it is thereunder.

When some obstructions are present in the lines, the center changes the relevant part in the internodal connection distance table 41 indicated in FIG. 9 to a non-connection state (1→0). In this connection state the center node prepares again an estimated delay time table by using the number of hops from the adjacent switching node to the destination node for each of the switching nodes and distributes it to them. Further, concerning the reports in the case where the queue length exceeds the threshold value, the center node changes the content of the relevant line portion in the internodal connection distance table 41 from 1 to 2, prepares a new estimated delay time table similarly as in the case of obstructions in the lines, and distributes it to each of the switching nodes.

Each of the switching nodes holds these tables in the memory 16 and when the processor 17 transmits a packet received from another switching node, it sends the packet in the line, for which the sum of the estimated delay time and the queue length of its own line is the shortest, referring to the tables, similarly to the embodiment 1.

Further, in the embodiment described above, although in the case where the estimated delay time is obtained on the basis of the waiting queue length produced in each of the lines or the case where the estimated delay time is calculated on the basis of the relay stages as has been described, it is possible to calculate the estimated delay time by also using other information indicating the load state, such as the use rate of line, the number of bits of real data in a waiting queue packet, the use rate of the processing device, etc.

Furthermore, although an example of the one-processor structure has been shown as the structure of the packet switching nodes, this invention can be applied to the case, where the hardware structure of a switching node includes a plurality of processors. In fact, this invention is applicable independently of the node structure hardware. Still further the state of the queue length may be determined not through the report from the line interface adapter to the processor, but rather directly by the processor itself.

As clearly shown by the two embodiments described above, according to this invention, since the estimated delay time table in each of the switching nodes is appropriately modified depending on the state of the lines in the packet switching network or the state of the queue length, even when looping phenomena, by which a packet circulates through more than three packet switching nodes, or ping-pong phenomena, by which a packet goes to and from two adjacent switching nodes, are produced, once a new estimated delay time table corresponding to the real state has been distributed, these phenomena can be eliminated. In addition, since the route giving the shortest estimated delay time is always selected, depending on the state of the packet switching network, an effect to reduce the mean transmission delay time of a packet in an network can be obtained with respect to the system, in which no routing table is modified depending on the state of the network.

As explained above, according to this invention, since the sending line is determined on the basis of the total delay time to the destination node calculated by using an estimated delay time table prepared by the routing control center, referring to the load state reported by each of the switching nodes, and the waiting queue of the relevant node, it is possible to select a route, depending not only on obstructions in lines or switching nodes but also on the load state at receiving switching nodes.

We claim:

1. A routing control method for a communication network including a plurality of switching nodes connected with each other through a plurality of relay lines and one of said switching nodes being a center node for network routing, said center node including memory means for storing network configuration information indicating connection relationships between said plurality of switching nodes and said plurality of relay lines contained in said communication network, comprising the steps of:
   reporting from each one of said plurality of switching nodes to said center node the corresponding status information of data transmission delay for each of said plurality of relay lines connected to each respective switching node;
   preparing an estimated delay table at said center node based on said network configuration information stored in said memory means and said status information of data transmission delay sent from said each switching node, said estimated delay table being divided into a plurality of subsections, each corresponding to a respective one of said plurality of switching nodes, and wherein each of said subsections including a plurality of bias values for each of said relay lines connected to the respective switching node corresponding to the subsection, each of said bias values representing a minimum value of data transmission delays obtained for a plurality of paths extending from switching nodes adjacent to said subsection switching nodes, via a corresponding relay line, to each one of said switching nodes in said communication network which is a destination switching node to which the respective data from said subsection switching node is to be transmitted to;

said center node notifying each one of said switching nodes of the corresponding bias values of its respective subsection; and determining at each of said switching nodes a corresponding relationship between the destination switching node to which the data is to be transmitted to and one of said relay lines through which the data is to be transmitted through, based on said corresponding bias values received from said center node and in conjunction with the actual state of data transmission delay at said switching node.

2. A routing method according to claim 1, wherein the step of reporting includes each one of said switching nodes periodically informing said center node of the status of data transmission delay with respect to each relay line said switching node is connected to.

3. A routing method according to claim 1, wherein the step of reporting includes each one of said switching nodes informing said center node of the status of data transmission delay for every relay line associated with each said switching node when a variation in the transmission delay in any relay line associated with said switching node exceeds a predetermined value.

4. A routing method according to claim 1, in which each one of said switching nodes transmits data in the form of a packet and said status of data transmission is represented by queue lengths of packets for each of said relay lines.

5. A routing method according to claim 1, in which said switching node determines and selects the relay line with the least delay for transmitting data therethrough to said destination switching node based on the sum of the bias value received from said center node for each of the relay lines and the real delay of data at said transmitting switching node for each of the relay lines of the corresponding subsection.

6. A routing method according to claim 5, wherein the step of reporting includes each one of said switching nodes periodically informing said center node of the status of data transmission delay with respect to each relay line connected to said switching node.

7. A routing method according to claim 5, wherein the step of reporting includes each one of said switching nodes informing said center node of the status of data transmission delay for every relay line associated with each said switching node when a variation in the transmission delay in any relay line associated with said switching node exceeds a predetermined value.

8. A routing method according to claim 5, in which each of said switching nodes transmits data in the form of a packet and said status of data transmission delay is represented by queue lengths of packets for each one of said relay lines.

9. A routing method according to claim 1, in which the bias value for each one of said relay lines estimated by said center node is a numerical value which is increased or decreased depending on the status of data transmission delay reported by each of said switching nodes using the bias value of adjacent switching nodes coupled to each respective relay line of the switching node which transmits the data, via its associated relay lines, to the destination switching node as the initial value; and said switching node determines and selects the relay line with the least delay for transmitting data therethrough to said destination switching node based on the sum of the numerical value representing the data transmission delay received from said center node for each of the relay lines and the numerical value representing the real delay of data at said transmitting switching node for each of the relay lines of the corresponding subsection.

10. A routing method according to claim 9, wherein the step of reporting includes each one of said switching nodes periodically informing said center node of the status of data transmission delay of each one of the respective relay lines connected to said node.

11. A routing method according to claim 8, in which the step for reporting includes each one of said switching nodes informing said center node of the status of data transmission delay for every relay line corresponding to each said switching node when a variation in the status of data transmission delay in any relay line associated with said switching node exceeds a predetermined value.

12. A routing method according to claim 9, in which each of said switching nodes transmits data in the form of a packet and said status of data transmission delay is represented by queue lengths of packets for each one of said relay lines.

* * * * *